Sept. 15, 1970 ÅKE LINDSTEDT 3,529,193
ROTOR FOR ELECTRIC MACHINE WITH VERTICAL SHAFT
Filed Jan. 24, 1969 3 Sheets-Sheet 1

INVENTOR.
ÅKE LINDSTEDT
BY
Jennings Bailey, Jr

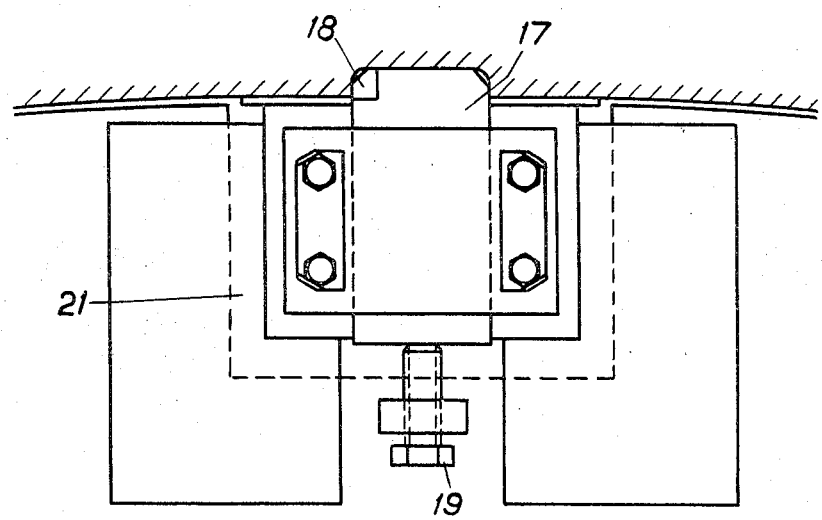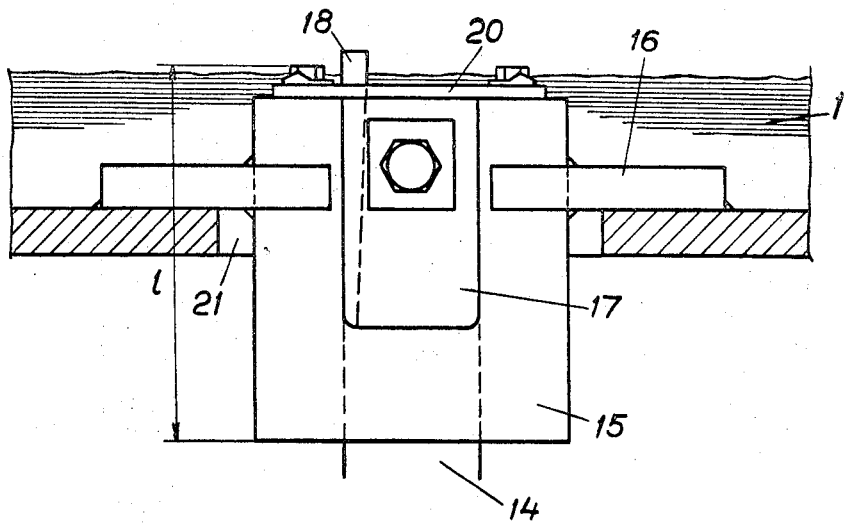

United States Patent Office 3,529,193
Patented Sept. 15, 1970

3,529,193
ROTOR FOR ELECTRIC MACHINE WITH VERTICAL SHAFT
Åke Lindstedt, Vasteras, Sweden, assignor to Allmänna Svenska Elektriska Aktiebolaget, Vasteras, Sweden, a corporation of Sweden
Filed Jan. 24, 1969, Ser. No. 793,811
Claims priority, application Sweden, Jan. 29, 1968, 1,113/68
Int. Cl. H02k *1/28*
U.S. Cl. 310—264   1 Claim

ABSTRACT OF THE DISCLOSURE

A dynamo-electric machine rotor is formed of a rotor ring and a supporting structure which includes a hub and axially spaced end plates secured to the hub. Radially extending web plates stiffen the end plates. The rotor ring has slots in its inside surface in which engage wedges for connecting the rotor ring to the end plates. The wedges are mounted in wedge holders carried by the end plates and extending through openings in the periphery thereof which are wider than the wedge holders. Blocking plates secured to the rotor ring at points adjacent the web plates hold the ring on the web.

BACKGROUND OF THE INVENTION

Field of the invention

The present invention relates to a dynamo-electric machine rotor comprising a rotor ring and a supporting structure therefor, said supporting structure comprising a hub, axially spaced end plates secured to the hub, a plurality of radially extending web plates stiffening said end plates and attachment means keying into axially extending slots in the inside surface of the rotor ring, the attachment means being arranged to allow free radial expansion of the rotor ring.

The prior art

The rotor ring is thus constructed as a so-called "floating ring" which means that, without being obstructed by the rotor supporting structure situated radially inside, the ring can expand under the influence of centrifugal forces. In an earlier construction of such a rotor which is described in Swiss Pat. No. 452,673, several longitudinally directed stiffening bars are arranged between said end discs at their outer edges, and a longitudinally directed wedge or a radial projection on the bar acts as centering means and forms a torque-transmitting connection between the bar and the rotor ring along the entire length of the rotor ring, while at the same time blocking plates which have the task of keeping the rotor supporting structure and the rotor ring fixed in axial position in relation to each other are attached to the rotor ring in such a way that they abut the end surfaces of the bars.

The above described construction has been found to have certain disadvantages. It has, for example, been found that the slots formed in the rotor rings for the torque-transmitting connection between the rotor ring and the rotor support structure are difficult to shape sufficiently straight and of uniform width.

Since, with a view to saving labour, the stiffening bars should be prefabricated, that is, provided with axially directed slots or axially directed radial projections before they are welded to the end discs, the slots or projections in the bars are easily somewhat misplaced in relation to corresponding slots in the rotor ring. It may then be difficult to position a long connecting wedge without further machining. There is also a risk that the effective contact surface of the wedge (or projection) becomes so small that torque-transmission and centering between wedge (or projection) and rotor ring is only carried out by a few of the plate segments of the rotor ring arranged axially after each other.

SUMMARY OF THE INVENTION

These disadvantages are essentially reduced when a construction according to the invention is used. The invention is based on the principle of effecting centering and torque-transmission by means of a relatively great number of short wedge holders intended for wedges having little axial extension, instead of using the stiffening bars for this purpose.

When said wedge holders are suitably dimensioned they cannot be used as stiffening bars between the end discs of the rotor stand, due to their small axial extension, and are consequently not suitable for transmitting axial force between the rotor support and the blocking plates of the rotor ring since each wedge holder has only direct mechanical connection with one of the two end plates of the rotor stand. In a machine according to the invention there are no stiffening bars, or it is provided with special stiffening bars which are only intended to strengthen the support structure and distribute the axial forces transmitted to this support structure from the rotor ring, and not for any torque-transmitting or centering function.

Since the wedge holder only has the purpose of transmitting torque and, contrary to the stiffening bars, need not be joined to the web plates, an additional advantage is gained with the construction according to the invention in that the torque-transmitting members—with respect to number and positioning—can be arranged substantially independently of the pitch between the arm plates.

A rotor according to the invention is characterised in that each end plate is provided with a number of wedge holders arranged between the arm plates and at the outer edge of the end plates, said wedge holders being intended to transmit the torque between the rotor ring and the rotor body, each wedge holder having an axial length which is less than the distance between the end plates and being provided with a recess in which an axially directed wedge rigidly held in the rotor ring is arranged and allowed to move radially with slight clearance, blocking plates for mutual axial fixation of the rotor ring and the rotor stand being arranged at the rotor ring with substantially the same angular positions as said web plates.

BRIEF DESCRIPTION OF THE DRAWINGS

One embodiment of the invention will be described in the following with reference to the accompanying drawings where

FIG. 3 shows an axial view of a torque-transmitting means according to the invention and FIG. 4 the same means in radial view looping outward from the center.

Figure 1:
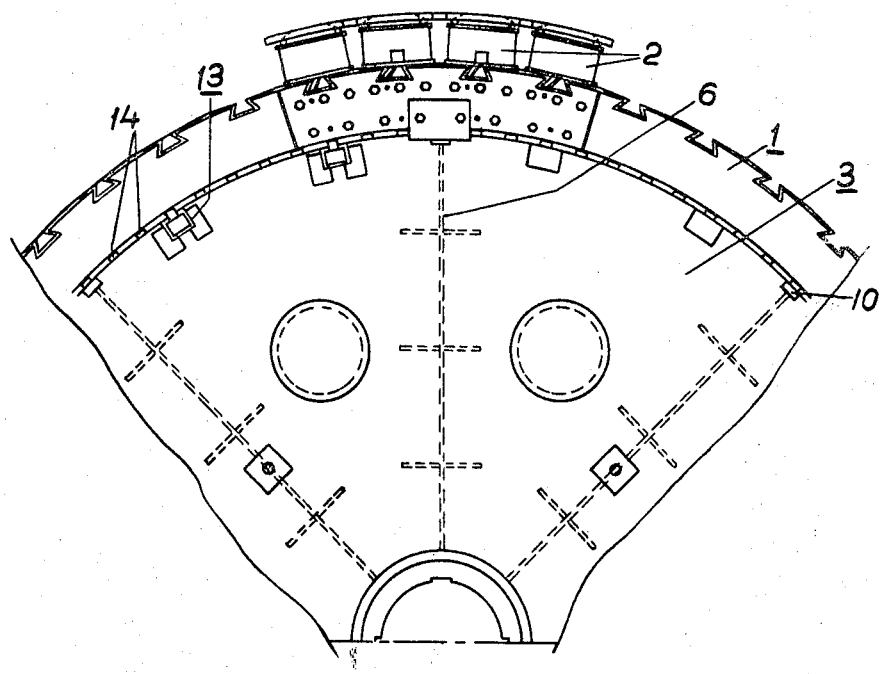
FIG. 1 shows a rotor according to the invention in partial top plan view and FIG. 2 is a radial section.
Figure 2:
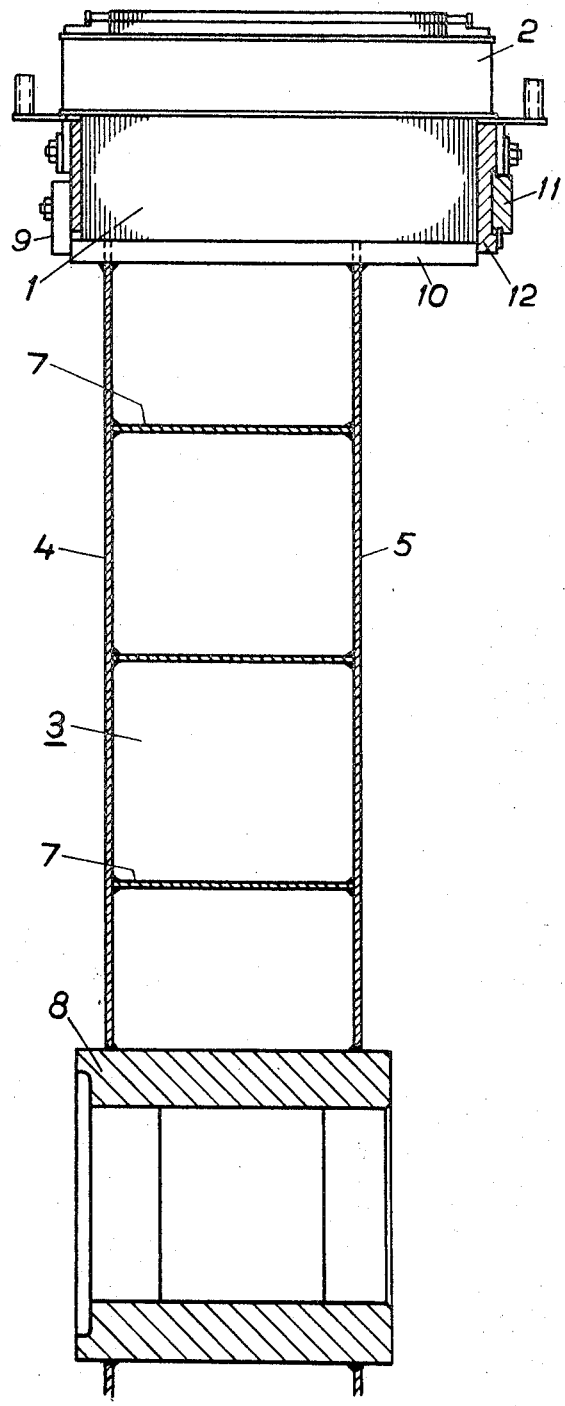

In the drawings 1 designates a rotor ring constructed of plate segments and 2 salient poles supported by the rotor ring. The rotor ring 1 is supported by a welded supporting structure 3 constructed of two end plates 4 and 5, the distance between them being L, and web plates 6 arranged between these end plates in axial planes together with short cross plates 7 which are arranged perpendicularly to the web plates. The rotor hub is designated 8. Axial forces between the rotor ring 1 and the supporting structure 3 are transmitted in one direction with the help of blocking plates 9 which are attached to bolts to the rotor ring and abut the upper end surfaces of stiffening bars 10 whereas braking forces operating vertically upwardly on a braking surface provided on the ring 11 are transmitted through the pressure ring 12. The stiffening bars 10 are welded to the end plates 4 and 5 and to corresponding web plates 6.

The inside of the rotor ring is provided with a plurality of axial slots 14 and some of these are each in engagement with two axially spaced torque-transmitting means 13. The means 13 has an axial dimension 1 and contains a U-shaped wedge holder 15 with two flange plates 16 welded on, which abut and are welded to one end plate. The wedge holder 15 supports a wedge 17 which is retained in the recess 14 with the help of an auxiliary wedge 18, while the part of the wedge 17 arranged in the wedge holder 15 is provided with a coating to decrease friction so that radial movement between wedge and wedge holder can take place when the rotor ring expands due to centrifugal forces. The screw 19 which is threaded in a lug 22 carried by end plate 4 and lid 20 hold the wedge in position even if the tension of the wedge in the recess 14 should for some reason be inadequate. The recess 21 in the end plate intended for the wedge holder 15 is considerably larger than the wedge holder, at least circumferentially so that the wedge holder and its wedge 17 can be adjusted to the correct position in relation to the slot 14 before the flange plates 16 of the wedge holder are welded to the end plates.

I claim:

1. A dynamo-electric machine rotor comprising a rotor ring and supporting structure therefor, said supporting structure comprising a hub, axially spaced end plates secured to said hub and a plurality of radially extending web plates stiffening said end plates, said rotor ring having axially extending slots in its inner surface, said end plates being provided with attachment means keying into said axially extending slots, the attachment means including means to allow free radial expansion of the rotor ring, said end plates having recesses therein between said web plates, said attachment means further including a plurality of wedge holders and radially projecting attachment parts rigidly fixed to said wedge holders, each wedge holder having a width substantially less than that of the recess, each of said attachment parts overlapping a recess and being welded to one of said end plates, each wedge holder being attached to one end plate only, wedges carried by said wedge holders engaging in said axially extending slots to transmit force between said rotor ring and said hub, and blocking plates for mutual axial fixation of the rotor ring and said supporting structure arranged in engagement with the rotor ring at angular positions substantially coinciding with the angular positions of said web plates.

References Cited

UNITED STATES PATENTS

| 1,817,054 | 8/1931 | Baudry | 310—261 |
| 1,844,710 | 2/1932 | Wood | 310—261 |
| 3,046,426 | 7/1962 | Gynt | 310—267 |

FOREIGN PATENTS

| 452,673 | 6/1968 | Sweden. |
| 1,260,016 | 2/1968 | Germany. |

MILTON O. HIRSHFIELD, Primary Examiner

B. A. REYNOLDS, Assistant Examiner

U.S. Cl. X.R.

310—157